(12) United States Patent
Ritchey

(10) Patent No.: US 7,044,084 B2
(45) Date of Patent: May 16, 2006

(54) PET TOY HAVING CONTROLLED MOVEMENT

(76) Inventor: Sharon A. Ritchey, 6043 E. Lowden Rd., Cave Creek, AZ (US) 85331

( * ) Notice: Subject to any disclaimer, the term of this patent is extended or adjusted under 35 U.S.C. 154(b) by 0 days.

(21) Appl. No.: 10/840,501

(22) Filed: May 6, 2004

(65) Prior Publication Data

US 2005/0263097 A1   Dec. 1, 2005

(51) Int. Cl.
*A01K 29/00* (2006.01)
(52) U.S. Cl. ............... 119/707; 119/702; 119/708; D30/160; 248/267
(58) Field of Classification Search ......... 119/707, 119/702, 708; D30/160; 231/2.1, 4, 5; 446/421, 446/422; 248/567; 482/83, 86, 88; 463/47.2, 463/47.5
See application file for complete search history.

(56) References Cited

U.S. PATENT DOCUMENTS

| 284,351 | A |  | 9/1883 | Arnold |
| 369,015 | A |  | 8/1887 | Knapp |
| D38,325 | S |  | 11/1906 | Timmins |
| 3,097,626 | A |  | 7/1963 | Felten |
| 4,499,855 | A |  | 2/1985 | Galkiewicz |
| 4,517,922 | A |  | 5/1985 | Lind |
| 4,577,590 | A |  | 3/1986 | Skroch |
| 4,712,510 | A |  | 12/1987 | Tae-Ho |
| 4,770,123 | A |  | 9/1988 | Bell |
| 4,930,448 | A |  | 6/1990 | Robinson |
| 4,940,018 | A |  | 7/1990 | Edling |
| D309,964 | S |  | 8/1990 | Viner et al. |
| D318,150 | S |  | 7/1991 | Eitel et al. |
| 5,045,014 | A | * | 9/1991 | Harkins ............... 446/236 |
| 5,148,769 | A |  | 9/1992 | Zelinger |
| D347,092 | S | * | 5/1994 | Ravel ............... D30/160 |
| 5,322,036 | A |  | 6/1994 | Merino |
| 5,467,740 | A |  | 11/1995 | Redwine |
| 5,474,032 | A |  | 12/1995 | Krietzman et al. |
| 5,575,241 | A |  | 11/1996 | Line |
| D381,475 | S | * | 7/1997 | Lynch ............... D30/160 |
| 5,657,721 | A | * | 8/1997 | Mayfield et al. ......... 119/707 |
| 5,743,215 | A |  | 4/1998 | Zeff |

(Continued)

OTHER PUBLICATIONS

Cats Claws Teasers, Http://www.catsclaws.com/Toys/teasers.htm, Dec. 9, 2003, 14 Pages.

*Primary Examiner*—Michael J. Carone
*Assistant Examiner*—Bret Hayes
(74) *Attorney, Agent, or Firm*—Tod R. Nissle, P.C.

(57) ABSTRACT

A pet toy (20) made up of a wand (26) and a play object (22) flexibly coupled to an end of the wand (26) is taught. The wand (26) has a wand shaft (50) and a wand head (52) rigidly affixed to the end of the wand shaft (50). The wand shaft (50) has a predetermined shaft diameter (54). The wand head (52) has a base width (58) greater than the shaft diameter (54). A flexible coupling (24) flexibly couples the play object (22) to the wand (26). The flexible coupling (24) has a coupling pocket (74) encompassing the wand head (52). The coupling pocket (74) is configured so that the wand head (52) has limited free movement therein. Motion of the wand (26) by a human therefore imparts a complex motion to the play object (22). This complex motion emulates the motion of prey and stimulates the instinct of the pet.

19 Claims, 2 Drawing Sheets

U.S. PATENT DOCUMENTS

| | | | |
|---|---|---|---|
| 5,755,184 A * | 5/1998 | Neidenberger | 119/707 |
| 5,782,207 A | 7/1998 | Goodham | |
| 5,829,391 A | 11/1998 | Krietzman et al. | |
| 5,881,679 A * | 3/1999 | Hann | 119/708 |
| 5,924,387 A | 7/1999 | Schramer | |
| 6,016,771 A | 1/2000 | Baiera et al. | |
| 6,318,300 B1 | 11/2001 | Renforth et al. | |
| D452,050 S | 12/2001 | Ritchey | |
| 6,378,464 B1 | 4/2002 | Ritchey | |
| 6,481,381 B1 | 11/2002 | Ritchey | |
| D477,694 S * | 7/2003 | Windham | D30/160 |
| 6,629,510 B1 * | 10/2003 | Robkin | 119/707 |

* cited by examiner

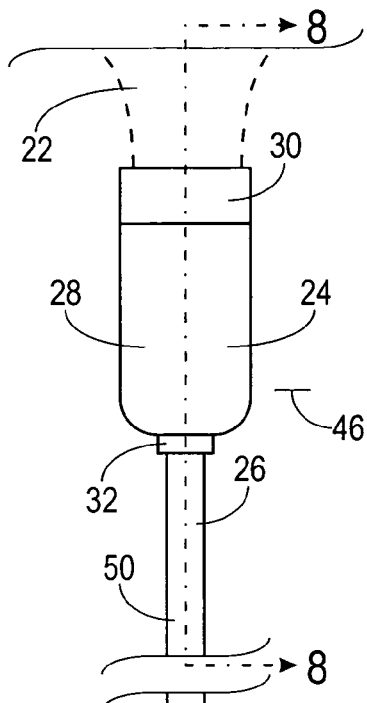
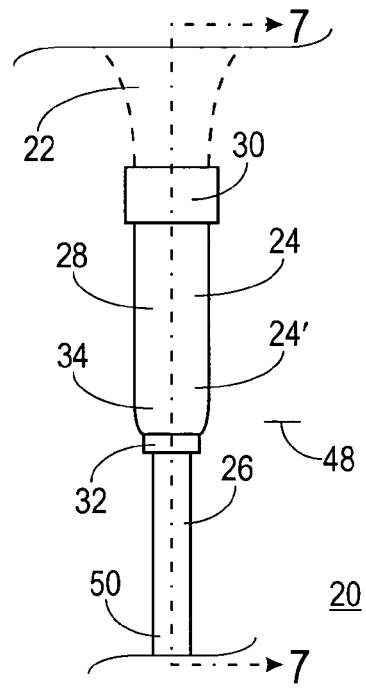
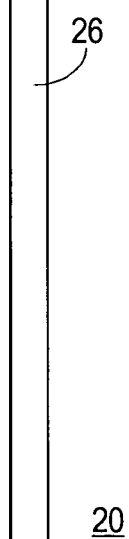
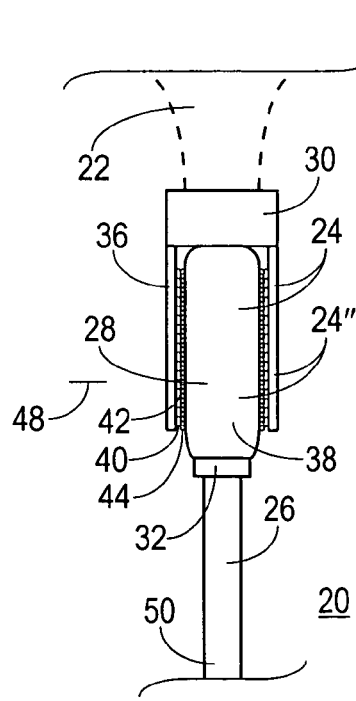
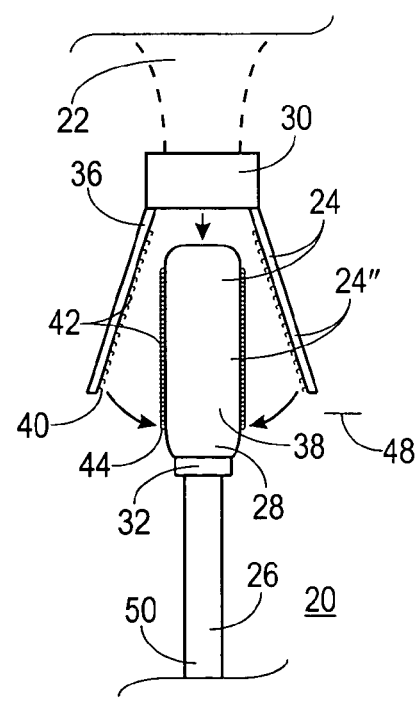
FIG. 1
FIG. 2
FIG. 3
FIG. 4

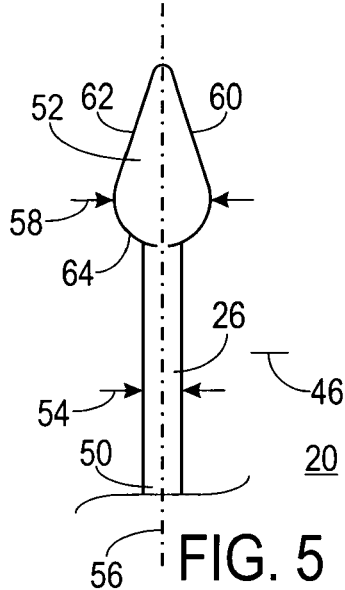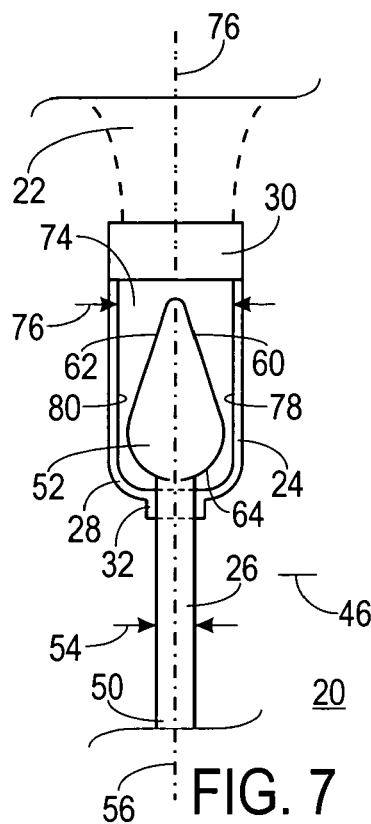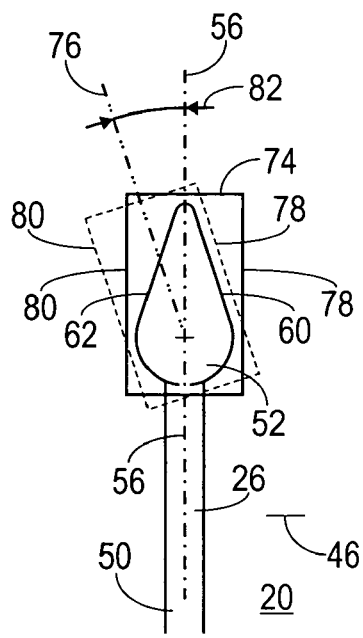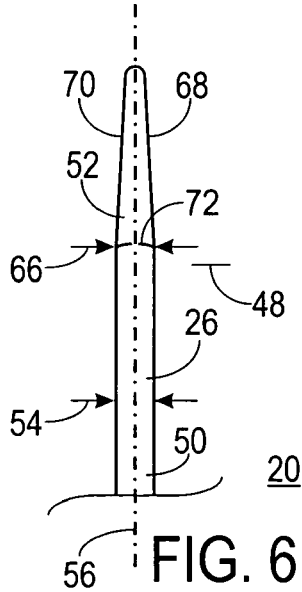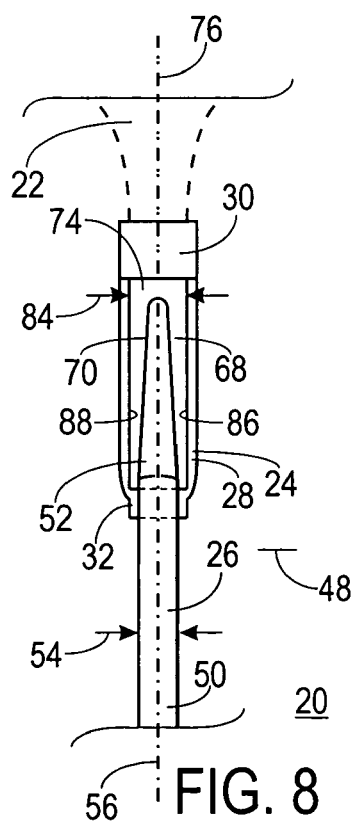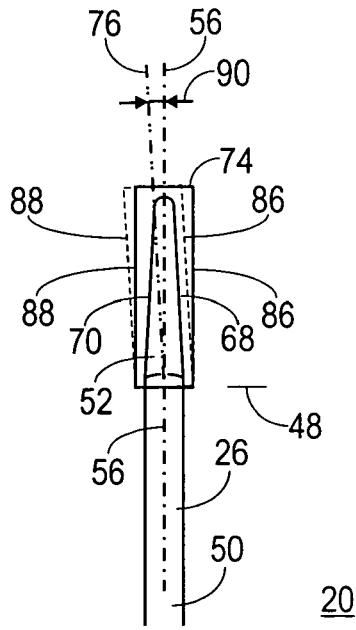

US 7,044,084 B2

PET TOY HAVING CONTROLLED MOVEMENT

TECHNICAL FIELD OF THE INVENTION

The present invention relates to the field of pet toys. More specifically, the present invention relates to the field of pet toys affixed to a wand.

BACKGROUND OF THE INVENTION

Among interactive pet toys, especially those pet toys intended to allow humans to interactively play with their pets, there exists a specific type of pet toy known as a "teaser." In its simplest form, a teaser consists of a wand upon an end of which is affixed a play object. A teaser is intended as an interactive toy for cats and other animals that instinctively hunt and pounce upon small prey, such as mice and birds.

When using a teaser, the human would shake the wand. This would cause the play object to bounce and bob enticingly before the pet. This triggers the pet's instincts, and the pet pounces upon and/or otherwise attacks the play object.

Ideally, the motion of the play object should emulate the motion of the animal's natural prey. Since the natural prey of cats and other similar-sized predators are mice, birds, lizards, and the like, it is desirable that the motion of the teaser emulates the movements of such small prey animals. Such emulation would maximally trigger instinctive responses and produce optimal interactive play for both the human and the pet.

The natural movement of small prey consists of relatively rapid short smooth motions and very rapid jerky motions. These motions are produced as the prey changes location and moves in place, respectively. In order to emulate these motions, the human would have to move the teaser wand so that the play object moves relatively rapidly over a broad area while very quickly jerking about.

The play object is typically firmly affixed to the end of the wand. In this case, the emulation of both the broader and the quicker motions is dependent solely upon the movement imparted to the wand by the human. To provide maximum stimulation, excessive and complex wrist action is required. This wrist action is both tiring and potentially injurious.

In some cases, the play object is loosely attached to the end of the wand. In this case, it is intended that the wand imparts the desired broader movements, while the movement of the play object on the end of the wand imparts the quicker movements. Unfortunately, a loosely attached play object tends to flop. This flopping is a poor emulation of the quicker movements at best, and tends to emulate injured or diseased prey at worst. A flopping prey may therefore arouse suspicion in the pet that the prey is sick. Many hunting animals instinctively avoid sick prey. A loosely attached, floppy teaser, therefore, produces a less than optimal effect.

The desired dual-action motion may be achieved through the use of a spring teaser, i.e., a teaser where the play object is attached to a spring or wire. With a spring teaser, the human may impart the broader motions, while the spring allows the play object to bob about and therefore imparts the quicker motions. The problem with spring teaser is one of control. Since the prey object bobs about on the end of the spring, it is virtually impossible for the human to determine where the play object will be at any given instant. This lack of control may result in the play object striking the pet unexpectedly. Such a strike may easily be interpreted by the pet as an attack. This in turn may cause the pet to become wary, and lessen the enjoyment for both the pet and the human.

What is desirable, therefore, is a teaser where the human imparts the broader movements through the wand while the play object is simultaneously free to make controlled quick movements about the end of the wand. Such a teaser would provide a maximal emulation of the movements of small prey without requiring undue care or effort on the part of the human, and without posing a risk of injury or displeasure to the pet.

SUMMARY OF THE INVENTION

Accordingly, it is an advantage of the present invention that a pet toy having controlled movement is provided.

It is another advantage of the present invention that a pet toy is provided that incorporates a play object coupled to the end of a wand.

It is another advantage of the present invention that a pet toy is provided that a play object is coupled to a wand in a manner allowing only controlled movement.

The above and other advantages of the present invention are carried out in one form by a pet toy formed of a play object having an object axis, a wand having a wand axis at an intersection of a first plane and a second plane, and a flexible coupling affixed to the play object, affixed to the wand, and configured so that the object axis may freely pivot no more than ±45° relative to the wand axis in the first plane.

The above and other advantages of the present invention are carried out in one form by a method of producing a pet toy that includes coupling a play object to a wand, limiting movement of the play object to no more than ±45° relative to the wand in a first plane, and limiting movement of the play object to no more than ±30° relative to the wand in a second plane substantially perpendicular to the first plane.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a plan view of a pet toy having a play object, a flexible coupling, and a wand in accordance with a preferred embodiment of the present invention;

FIG. 2 shows a side view of a pet toy demonstrating a one-piece flexible coupling in accordance with a preferred embodiment of the present invention;

FIG. 3 shows a side view of a pet toy demonstrating a two-piece flexible coupling in accordance with a preferred embodiment of the present invention;

FIG. 4 shows a side view of a pet toy demonstrating attachment and detachment of the two-piece flexible coupling of FIG. 3 in accordance with a preferred embodiment of the present invention;

FIG. 5 shows a plan view of a wand for a pet toy in accordance with a preferred embodiment of the present invention;

FIG. 6 shows a side view of a wand for a pet toy in accordance with a preferred embodiment of the present invention;

FIG. 7 shows a cross sectional plan view of a pet toy taken at line 7—7 of FIG. 2 and demonstrating a wand head encompassed with a coupling pocket in accordance with a preferred embodiment of the present invention;

FIG. 8 shows a cross sectional side view of a pet toy taken at line 8—8 of FIG. 1 and demonstrating a wand head encompassed with a coupling pocket in accordance with a preferred embodiment of the present invention;

FIG. 9 shows a schematic view demonstrating controlled movement in a first plane of a coupling pocket relative to a wand head in accordance with a preferred embodiment of the present invention; and FIG. 10 shows a schematic view demonstrating controlled movement in a second plane of a coupling pocket relative to a wand head in accordance with a preferred embodiment of the present invention.

DETAILED DESCRIPTION OF THE PREFERRED EMBODIMENTS

FIGS. 1, 2, 3, and 4 show a plan view (FIG. 1) and side views (FIGS. 2, 3, and 4) of a pet toy 20 having a play object 22, a one-piece (FIG. 2) or two-piece (FIGS. 3 and 4) flexible coupling 24, and a wand 26 in accordance with a preferred embodiment of the present invention. The following discussion refers to FIGS. 1, 2, 3, and 4.

Pet toy 20 is a "teaser," i.e., pet toy 20 consists of wand 26 to which play object 22 is attached. In the present invention, play object 22 is attached to wand 26 by flexible coupling 24. Flexible coupling 24 is configured to impart a controlled movement to play object 22 relative to wand 26 as discussed hereinafter.

In the Figures, play object 22 is depicted as undefined. This is because play object 22 may be any of a large class of objects. Exemplary play objects 22 include, but are not limited to, a ball, a stuffed object, a catnip container, a feather, or a cluster of feathers, synthetic tinsel, yarn, or string. Those skilled in the art will appreciate that the form of play object 22 is not a part of the present invention. The use of any specific object or objects for play object 22 does not depart from the spirit of the present invention.

In the preferred embodiment, pet toy 20 is produced by coupling play object 22 to wand 26 via flexible coupling 24. Flexible coupling 24 has a flexible coupling body 28. Coupling body 28 is desirably affixed to play object 22 by an object collar 30 and affixed to wand 26 by a wand collar 32.

Flexible coupling 24 needs to be flexible. In the preferred embodiment, therefore, coupling body 28 is desirably formed of a fabric (not shown) to allow flexible coupling 24 to flex freely during use. The use of fabric also has the desirable effect of maintaining a low assembly cost. It will be understood, however, that this is not a requirement of the present invention. Other materials may be used to form the coupling body without departing from the spirit of the present invention.

Object and wand collars 30 and 32 serve only to attach flexible coupling 24 to play object 22 and wand 26, respectively. It is therefore not necessary that object and wand collars 30 and 32 be themselves flexible. For example, in the preferred embodiment, wand collar 32 is desirably affixed to wand 26 by an adhesive (not shown). This adhesive may saturate wand collar 32 and render wand collar 32 inflexible. Similarly, object and wand collars 30 and 32, while components of flexible coupling 24, need not be integral to coupling body 28. For example, in an alternative embodiment (not shown), wand collar 32 may be a ring clip or other clamping device configured to securely affix coupling body 28 to wand 26. Those skilled in the art will appreciate that the forms taken by object collar 30 and wand collar 32 are not a part of the present invention. The use of any particular forms for object collars 30 and 32 does not depart from the spirit of the present invention.

Flexible coupling 24 may be a one-piece flexible coupling 24' (FIG. 2), or a two-piece flexible coupling 24" (FIGS. 3 and 4). When flexible coupling 24 is one-piece flexible coupling 24', then coupling body 28 consists of an object-wand connector 34 between object collar 30 and wand collar 32. Object-wand connector 34 effectively forms a substantially permanent flexible connection between play object 22 and wand 26.

Alternatively, when flexible coupling 24 is two-piece flexible coupling 24", then coupling body consists of an object connector 36 substantially permanently affixed to play object 22 and a wand connector 38 substantially permanently affixed to wand 26. Object connector 36 is configured to detachably couple to wand connector 38. In the preferred embodiment of FIGS. 3 and 4, this is accomplished by incorporating into object connector a first portion 40 of a hook-and-loop connector 42, and by incorporating into wand connector 38 a second portion 44 of hook-and-loop connector 44. First and second portions 40 and 44 of hook-and-loop connector 42 are configured to engage each other, as demonstrated in FIG. 4, to detachably couple play object 22 to wand 26.

Those skilled in the art will appreciate that connectors other than hook-and-loop connector 42 may be used to form two-piece flexible coupling 24". The use of any other form of attachment to couple object connector 36 to wand connector 38 does not depart from the spirit of the present invention.

It will also be appreciated that the use of two-piece flexible coupling 24" is preferable over one-piece flexible coupling 24' in that two-piece flexible coupling 24" allows the use of multiple play objects 22 with a single wand 26. For the sake of simplicity and clarity, however, one-piece flexible coupling 24', referred to simply as flexible coupling 24, will be assumed for the remainder of this discussion except where specifically indicated otherwise.

In the Figures, FIGS. 1, 5, 7, and 9 depict plan or "top" views, while FIGS. 2, 3, 4, 6, 8, and 10 depict side views. That is, FIGS. 1, 5, 7, and 9 depict pet toy 20 and/or wand 26 in a plan plane 46, while FIGS. 2, 3, 4, 6, 8, and 10 depict pet toy 20 and/or wand 26 in a side plane 48 substantially perpendicular to plan plane.

FIGS. 5 and 6 show a plan view (FIG. 5) and a side view (FIG. 6) of wand 26 for pet toy 20 in accordance with a preferred embodiment of the present invention. The following discussion refers to FIGS. 1, 2, 5, and 6.

Wand 26 is formed of a wand shaft 50 onto one end of which is rigidly affixed wand head 52. Wand shaft 50 is desirably cylindrical, though this is not a requirement of the present invention, and has a predetermined shaft diameter 54. Wand 26 has a wand axis 56 extending longitudinally through a center of wand shaft 50 at an intersection of plan and side planes 46 and 48.

In the preferred embodiment, wand head 52 is desirably asymmetrical relative to wand axis 56. In plan plane 46 (FIG. 5), wand head 52 desirably has a base width 58 substantially wider than shaft diameter 54, though this is not a requirement of the present invention. Wand head 52 is also desirably formed in plan plane 46 with a shape incorporating a first plan-plane head side 60 and a second plan-plane head side 62. Head sides 60 and 62 are desirably straight, though this is not a requirement of the present invention.

In the preferred embodiment, plan-plane head sides 60 and 62 are two sides of a modified triangle. In this embodiment, wand head 52 also has a plan-plane base 64 whose width is base width 58. Desirably, base 64 is a tangential arcuate base flowing smoothly into head sides 60 and 62. This gives wand head 52 a "spade" shape in horizontal plane 46, which has certain advantages discussed hereinafter.

Those skilled in the art will appreciate that wand head 52 may have a shape in plan plane 46 other than that of a modified triangle without departing from the spirit of the present invention.

In side plane 48 (FIG. 6), wand head 52 desirably has a base thickness 66 substantially equal to shaft diameter 54, though this is not a requirement of the present invention. Similarly, wand head 52 is also desirably formed in side plane 48 with a shape incorporating a first side-plane head side 68 and a second side-plane head side 70. Head sides 68 and 70 are desirably straight, though this is not a requirement of the present invention.

In the preferred embodiment, side-plane head sides 68 and 70 are two sides of a modified triangle. In this embodiment, wand head 52 also has a side-plane base 72 whose thickness is head base thickness 58, i.e., is shaft diameter 54. This gives wand head 52 a wedge shape in side plane 48, which has certain advantages discussed hereinafter.

Those skilled in the art will appreciate that wand head 52 may have a shape in side plane 68 other than that of a modified triangle without departing from the spirit of the present invention.

FIGS. 7 and 8 show cross sectional plan and side views of pet toy 20 taken at lines 7—7 and 8—8 of FIGS. 2 and 1, respectively, and demonstrating wand head 52 encompassed with a coupling pocket 74 in accordance with a preferred embodiment of the present invention. FIGS. 9 and 10 show schematic views of FIGS. 7 and 8, respectively, and demonstrating controlled movement of coupling pocket 74 relative to wand head 52. The following discussion refers to FIGS. 1, 2, 5, 6, 7, 8, 9, and 10.

Flexible coupling 24 is affixed to play object 22 and wand 26 via object and wand collars 30 and 32. Play object 22 may be aligned so that an object axis 76 extending through a nominal center (not shown) of play object 22 aligns with wand axis 56. In this discussion, such an alignment is an arbitrary "rest condition," and is the condition depicted in FIGS. 1, 2, 7, and 8. When in this arbitrary rest condition, object axis 76 and wand axis 56 are both at the intersection of plan and side planes 46 and 48.

Coupling body 28 is hollow. Coupling pocket 74 is an internal pocket within coupling body 28, i.e., within flexible coupling 24. Those skilled in the art will appreciate that the materials and formation of coupling pocket 74 are discussed herein as being part and parcel with the materials and formation of flexible coupling 24. While it is desirable that coupling pocket 74 be formed of the same materials as, and coincidentally with the remainder of, coupling body 28, this is not a requirement of the present invention. For example, in some embodiments, it may be desirable that coupling pocket 74 be separately formed as an insert to be placed within flexible coupling 24 during production. The use of specific materials and/or formation techniques well known to those of ordinary skill in the art does not depart from the spirit of the present invention.

When flexible coupling 24 is formed, coupling pocket 74 is formed and/or placed within coupling body 28 (i.e., within flexible coupling 24). When flexible coupling 24 is affixed to wand 26, wand head 52 is encompassed within coupling pocket 74 and wand collar 32 is affixed to wand shaft 50 proximate wand head 52.

In the preferred embodiment, coupling pocket 74 is desirably asymmetrical relative to object axis 76. In plan plane 46 (FIG. 7), coupling pocket 74 desirably has a pocket width 76 greater than base width 58. Coupling pocket 74 is also desirably formed in plan plane 46 with a shape incorporating a first plan-plane pocket side 78 and a second plan-plane pocket side 80. Pocket sides 78 and 80 are desirably straight, though this is not a requirement of the present invention.

Coupling pocket 74 is formed so that, when wand head 52 is encompassed within coupling pocket 74 and flexible coupling 24 is deflected in plan plane 46 (FIG. 9) so that one of pocket sides 78 and 80 is substantially parallel with one of head sides 60 and 62, the other of pocket sides 78 and 80 is aparallel (i.e., not parallel) with the other of head sides 60 and 62. This is accomplished in the preferred embodiment by forming coupling pocket 74 so that plan-plane sides 78 and 80 are two opposing sides of a modified rectangle.

Those skilled in the art will appreciate that coupling pocket 74 may have a shape in plan plane 46 other than that of a modified rectangle. For example, if wand head 52 were to have the shape of a modified rectangle, then coupling pocket 74 may have the shape of a modified trapezoid to achieve the same ends. Any given set of functional shapes for wand head 52 and coupling pocket 74 may be used without departing from the spirit of the present invention.

By forming coupling pocket 74 so that when pocket side 78 is substantially parallel with head side 60, pocket side 80 is aparallel with head side 62, play object 22 is able to pivot relative to wand 26 in plan plane 46. Because of this, object axis 76 may freely pivot a predetermined plan-plane pivot angle 82 in plan plane 46 relative to wand axis 56 (FIG. 9). In the preferred embodiment, coupling pocket 74 is configured relative to wand head 52 so that object axis 76 may pivot at least ±10° and not greater than ±45° relative to wand axis 56. Movement of play object 22 relative to wand 26 is therefore at least ±10° but limited to ±45° in plan plane 46.

By forming wand head 52 in a "spade" shape, i.e., as a modified isosceles triangle having a tangential arcuate base, wand collar 32 may be affixed to wand shaft 50 closely proximate wand head 52. This allows a greater freedom of movement of coupling pocket 74 with a reduction of material and cost for flexible coupling 24. Those skilled in the art will appreciate while a spade-shaped wand head 52 is desirable, it is not a requirement of the present invention. Other shapes may be used for wand head 52 without departing from the spirit of the present invention.

In side plane 48 (FIG. 8), coupling pocket 74 desirably has a pocket thickness 84 greater than base thickness 66. Coupling pocket 74 is also desirably formed in side plane 48 with a shape incorporating a first side-plane pocket side 86 and a second side-plane pocket side 88. Pocket sides 86 and 88 are desirably straight, though this is not a requirement of the present invention.

Coupling pocket 74 is formed so that, when wand head 52 is encompassed within coupling pocket 74 and flexible coupling 24 is deflected in side plane 48 (FIG. 10) so that one of pocket sides 86 and 88 is substantially parallel with one of head sides 68 and 70, the other of pocket sides 86 and 88 is aparallel with the other of head sides 68 and 70. This is accomplished in the preferred embodiment by forming coupling pocket 74 so that side-plane sides 86 and 88 are two opposing sides of a modified rectangle.

Those skilled in the art will appreciate that coupling pocket 74 may have a shape in side plane 48 other than that of a modified rectangle. Any given set of functional shapes for wand head 52 and coupling pocket 74 may be used without departing from the spirit of the present invention.

By forming coupling pocket 74 so that when pocket side 86 is substantially parallel with head side 68, pocket side 88 is aparallel with head side 70, play object 22 is able to pivot relative to wand 26 in side plane 48. Because of this, object axis 76 may freely pivot a predetermined side plane pivot angle 90 in side plane 48 relative to wand axis 56 (FIG. 10). In the preferred embodiment, coupling pocket 74 is configured relative to wand head 52 so that object axis 76 may pivot at least ±5° and not greater than ±30° relative to wand axis 56. Movement of play object 22 relative to wand 26 is therefore at least ±5° but limited to ±30° in side plane 48.

By forming wand head 52 in a "spade" shape (i.e., as a modified isosceles triangle having a tangential arcuate base) in plan plane 48 and as a wedge (i.e., as a modified triangle) in side plane 48, wand collar 32 may be affixed to wand shaft 50 closely proximate wand head 52. This allows a greater freedom of movement of coupling pocket 74 with a reduction of material and cost for flexible coupling 24. Those skilled in the art will appreciate while a spade-shaped wedge wand head 52 is desirable, it is not a requirement of the present invention. Other shapes may be used for wand head 52 without departing from the spirit of the present invention.

By allowing play object a movement relative to wand 26 of at least ±10° in plan plane 46 and ±5° in side plane 48, but limiting that movement to not more than ±45° in plan plane 46 and not more than ±30° in side plane 48, play toy 20 provides a human the ability to easily and effectively emulate broad prey motions through the gross movements of wand 26 while simultaneously emulating short, quick prey movements through the restricted independent movements of play object 22 on the end of wand 22. This composite motion directly stimulates the instincts of a cat or other small carnivore and significantly increases the pleasure of play for both human and pet.

The following discussion refers to FIGS. 1, 3, 4, 7, and 8.

When pet toy 20 is produced with two-part flexible coupling 24″, it is desirable that coupling pocket 74 be integral to wand connector 38, rather than object connector 36. This construct provides a maximum of flexibility in that multiple play objects 22 may be utilized with a single wand 22 and associated coupling pocket. Easily changed multiple play objects 22 alloy pet toy to be customized according to the preferences and/or moods of both the human and the pet.

Also, because the pet attacks (i.e., bites or claws) play object 22 but not wand 26, it is likely that play object 22 will wear out first. The two-piece construct of pet toy 20 permits the replacement of a worn-out play object 22 with a new play object 22. This allows extension of the life of pet toy 20 into the indefinite future.

In summary, the present invention teaches a pet toy 20 having controlled movement. Pet toy 20 incorporates a play object 22 coupled to the end of a wand 26 in a manner allowing predetermined controlled movement.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A pet toy comprising:
  a play object having an object axis;
  a wand having a distal end and a wand axis at an intersection of a first plane and a second plane; and
  a flexible fabric coupling affixed to said play object, affixed to said wand, and flexibly interconnecting said play object and wand, and spanning a distance between said play object and said wand such that said play object is spaced apart from said wand, and configured so that
    said play object and said object axis freely pivot up to 45° relative to said wand and said wand axis in said first plane, and
    said fabric coupling bends
  when said play object pivots relative to said wand.

2. A pet toy as claimed in claim 1 wherein said flexible fabric coupling is configured so that said play object and said object axis freely pivot at least ∓10° relative to said wand and said wand axis in said first plane.

3. A pet toy as claimed in claim 1 wherein said flexible fabric coupling is configured so that said play object and said object axis freely pivot up to 30° relative to said wand axis in said second plane substantially perpendicular to said first plane.

4. A pet toy as claimed in claim 3 wherein said flexible coupling is configured so that said play object and said object axis freely pivot at least ∓5 relative to said wand axis in said second plane.

5. A pet toy as claimed in claim 1 wherein said wand comprises:
  a wand shaft;
  a wand head on said distal end;
  said flexible coupling comprises
    a coupling pocket configured to encompass said wand head; and,
  a wand collar secures said flexible coupling to said wand shaft proximate said wand head.

6. A pet toy as claimed in claim 5 wherein:
  said wand head has a first head side and a second head side; and
  said coupling pocket has a first pocket said and a second pocket side, wherein, when said first pocket side is substantially parallel to said first head side, said second pocket side is aparallel to said second head side.

7. A pet toy as claimed in claim 5 wherein, in one of said first and second planes, said wand head is substantially triangular and said coupling pocket is substantially rectangular.

8. A pet toy as claimed in claim 5 wherein, in one of said first and second planes, said wand head on said distal end is substantially an isosceles triangle having a substantially tangential arcuate base.

9. A pet toy a claimed in claim 1 further comprising
  a first connector affixed to said flexible fabric coupling; and
  a second connector detachably affixed to said flexible fabric coupling.

10. A pet toy as claimed in claim 9 wherein:
  said first connector comprises a first portion of a hook-and-loop connector; and,
  said second connector comprises a second portion of said hook-and-loop connector configured to engage said first portion.

11. A pet toy comprising
  a wand comprising
    a wand shaft having a predetermined shaft diameter;
    a wand head rigidly affixed to one end of said wand shaft and having a width greater than said shaft diameter;
  a play object;
  a flexible fabric coupling bridging a distance between said play object and said wand head, affixed to and interconnecting said play object and said wand head, and including first and second opposing flexible pieces of fabric each spanning said distance between said play object and said wand head.

12. A pet toy as claimed in claim 11 wherein said flexible fabric coupling comprises a coupling pocket encompassing said wand head.

13. The pet toy as claimed in claim 12 wherein said wand head has first and second opposing sides each in a different one of a pair of planes; and
said coupling pocket has first and second pocket sides each in a different one of said planes, wherein when said first pocket side is substantially parallel to said first head side, said second pocket side is aparallel to said second head side.

14. A method of producing a pet toy with at least one flexible piece of fabric, said method comprising the steps of:
   a) coupling a play object to a wand with the flexible piece of fabric, the flexible piece of fabric spanning a distance between said play object and said wand and permitting said play object to pivot with respect to and spaced apart from said wand and to bend the flexible piece of fabric;
   b) limiting with said flexible fabric coupling movement of said play object to up to 45° relative to said wand in a first plane; and
   c) limiting with said flexible fabric coupling movement of said play object to up to 30° relative to said wand in a second plane substantially perpendicular to said first plane.

15. A method as claimed in claim 14 additionally comprising:
   d) forming a wand head for said wand wherein said wand head has a first head side in said first plane and a second head side in said second plane;
   e) forming a coupling pocket having first and second pockets sides each in a different one of said planes; and
   f) encompassing said wand head in said coupling pocket so that, when said first pocket side is substantially parallel to said first head side, said second pocket side is aparallel to said second head side.

16. A method as claimed 15 wherein:
   said forming activity d) forms said wand head as substantially an isosceles triangle having a substantially tangential arcuate base; and
   said forming activity e) forms said coupling pocket as substantially a rectangle.

17. A method as claimed in claim 14 wherein said coupling activity a) further comprises:
   d) affixing an object connector to said flexible fabric piece;
   e) affixing a wand connector to said wand; and
   f) connecting said object connector to said wand connector.

18. A method as claimed in claim 17 additionally comprising:
   forming a wand head for said wand;
   forming a coupling pocket integral to said wand connector; and
   encompassing, during said affixing activity e), said wand head withing said coupling pocket to effect said limiting activities b) and c).

19. A method as claimed in claim 17 wherein:
   said object connector comprises a first portion of a hook-and-loop connector;
   said wand connector comprises a second portion of said hook-and-loop connector; and
   said connecting activity f) detachably connects said object connector to said wand connector via said hook-and-loop connector.

* * * * *